United States Patent [19]

Miura

[11] Patent Number: 4,531,747
[45] Date of Patent: Jul. 30, 1985

[54] EXTENDED WEAR ANNULAR OIL SEAL

[75] Inventor: Takeshi Miura, Fujisawa, Japan

[73] Assignee: Nippon Oil Seal Industry Co., Ltd., Tokyo, Japan

[21] Appl. No.: 639,532

[22] Filed: Aug. 9, 1984

Related U.S. Application Data

[63] Continuation of Ser. No. 438,153, Nov. 1, 1982, abandoned.

[51] Int. Cl.³ .............................................. F16J 15/32
[52] U.S. Cl. .................................... 277/134; 277/153
[58] Field of Search .............................. 277/133–135, 277/152, 153

[56] References Cited

U.S. PATENT DOCUMENTS

| 3,259,393 | 7/1966 | Dega | 277/134 |
| 3,455,564 | 7/1969 | Dega | 277/134 |
| 3,482,845 | 12/1969 | Bertrandi et al. | 277/134 |
| 3,515,395 | 6/1970 | Weinand | 277/134 |
| 3,534,969 | 10/1970 | Weinland | 277/134 X |
| 3,589,739 | 6/1971 | Scholten | 277/134 X |
| 3,606,353 | 9/1971 | Heinl | 277/134 |
| 3,633,927 | 1/1972 | Van Deven | 277/134 |
| 3,934,888 | 1/1976 | Lutz | 277/134 |
| 4,288,083 | 9/1981 | Braconier | 277/134 |
| 4,399,998 | 8/1983 | Otto | 277/153 X |

FOREIGN PATENT DOCUMENTS

| 492543 | 4/1978 | Australia | 277/134 |
| 1153578 | 8/1963 | Fed. Rep. of Germany | 277/134 |
| 1284203 | 11/1968 | Fed. Rep. of Germany | 277/134 |
| 2736207 | 2/1979 | Fed. Rep. of Germany | 277/134 |
| 2456888 | 12/1980 | France | 277/134 |
| 225796 | 3/1969 | Sweden | 277/134 |
| 1219272 | 1/1971 | United Kingdom | 277/134 |
| 1239873 | 7/1971 | United Kingdom | 277/134 |
| 2040009A | 8/1980 | United Kingdom | 277/134 |
| 679755 | 8/1979 | U.S.S.R. | 277/134 |

Primary Examiner—Robert S. Ward
Attorney, Agent, or Firm—Armstrong, Nikaido, Marmelstein & Kubovcik

[57] ABSTRACT

A sealing apparatus comprises an annular elastic seal member having a main annular lip and an auxiliary annular lip extending substantially radially inwardly to a rotatable shaft with inclination so as to define an annular chamber between both the lips. A plurality of projections or grooves are formed in an inner peripheral surface of the auxiliary annular lip in the vicinity of a sealing portion thereof to form flow passages which allow the annular chamber to be communicated to the atmosphere upon generation of vacuum within the annular chamber, to thereby prevent excessive contact pressure from being applied to the sealing portions of the main and auxiliary sealing lips under action of vacuum and protect the seal from abrasion.

8 Claims, 7 Drawing Figures

EXTENDED WEAR ANNULAR OIL SEAL

This application is a continuation of application Ser. No. 438,153, filed 11/1/82, now abandoned.

BACKGROUND OF THE INVENTION

1. Field of the Invention

The present invention relates in general to a sealing apparatus for providing seal between two rotary members which are arranged coaxially and rotatably relative to each other. In particular, the invention concerns an annular oil seal of outer rubber periphery type provided with a main sealing lip and an auxiliary sealing lip. More particularly, the invention is directed to an improvement of the oil seal in which a vacuum (negative pressure) produced in an annular space defined between the main sealing lip and the auxiliary sealing lip upon relative rotation of the two members is compensated to thereby prevent areal contact pressure of the sealing lips from being excessively increased.

2. Description of the Prior Art

For having a better understanding of the present invention, description will first be made on hitherto known sealing apparatus of the type mentioned above. FIG. 1 of the accompanying drawings shows a prior art annular oil seal of the outer rubber periphery type. Referring to the figure, the annular oil seal generally denoted by a reference numeral 1' includes an outer peripheral portion 11' at which the oil seal 1' is secured to a housing 2', a supporting portion 12' extending radially inwardly from the outer peripheral portion 11', a base portion 14' formed integrally with the supporting portion 12', and a main lip 15' and an auxiliary lip 18' both formed integrally with the base portion 14' and extending inwardly to a rotatable shaft 3' in a bifurcated manner with inclination relative thereto. Formed between the main lip 15' and the auxiliary lip 18' is an annular channel which defines an annular chamber 17' in cooperation with the rotatable shaft 3', when the oil seal 1' is mounted on the latter.

In the structure of the oil seal described above, it is known from experience that a fluid (e.g. air) confined within the annular chamber 17' tends to leak therefrom in the axially inward direction (toward the right as viewed in FIG. 1) under suction exerted onto the main lip 15', when the shaft 3' is rotated, notwithstanding such arrangement that the sealing tip of the main seal lip 15' is in hermetical contact with the shaft 3'. On the other hand, flowing of fluid or air into the annular chamber 17' from the atmosphere is positively prevented under the sealing action of the auxiliary sealing lip 18'. Under the circumstance, the pressure within the annular chamber 17' is lowered, i.e. a vacuum prevails within the chamber 17' (this phenomenon of generation of vacuum in the annular chamber 17' has heretofore been widely known from experience). As the consequence, the main lip 15' and the auxiliary lip 18' made of an elastic material such as rubber or the like undergo elastic deformation in the direction to decrease the volume of the annular chamber for compensating the reduction in pressure, resulting in that the contact pressure of both the lips 15' and 18' which are forcibly pressed against the peripheral surface of the rotating shaft 3 becomes excessively increased, involving increased friction and hence heat generation as well as excessive abrasion. In other words, the oil seal of the structure exemplified in FIG. 1 suffers a serious problem in respect to the sealing performance.

As an attempt to deal with the above problem, i.e. to compenate the vacuum produced in the annular chamber 17', there has also been proposed a structure of the oil seal shown in FIG. 2 of the accompanying drawings. This oil seal differs from the one shown in FIG. 1 in that at least a through-hole 180' is formed in the auxiliary sealing lip 18' to allow the annular chamber 17' to be communicated to the atmosphere so that the normal pressure state is constantly maintained within the annular chamber 17'. However, the oil seal of this structure is also disadvantageous in that dust or like foreign particles will flow into the annular chamber 17' through the constantly opened through-hole 180' and tend to be deposited particularly at the sealing end face of the main lip 15', to thereby bring about premature abrasion of the slideably contacting portions.

SUMMARY OF THE INVENTION

It is therefore an object of the present invention to provide a sealing apparatus which is immune to the shortcomings of the hitherto known sealing apparatus described above.

It is another object of the present invention to provide a sealing apparatus of such a structure that generation of vacuum within the annular chamber as well as invasion of foreign particles into the annular chamber is positively prevented, to thereby protect the slideably contacting portions of both the main and auxiliary lips and the rotatable shaft from abrasion and thus assure an improved sealing performance throughout the elongated useful life.

In view of the above and other objects which will become more apparent as description proceeds, there is provided according to an aspect of the invention a sealing apparatus, and more specifically, an oil seal, which comprises an elastic seal body of outer rubber periphery type provided with a main lip and an auxiliary lip and combined with a rotatable shaft in a coaxial arrangement, wherein both the main lip and the auxiliary lip extend inwardly to the rotatable shaft with inclination thereto to thereby define an annular chamber between both lips in cooperation with the rotatable shaft. The sealing apparatus further includes flow passage forming means including a plurality of spaced elements (preferably in the form of grooves or projections) provided on the inner peripheral surface of the auxiliary lip in the vicinity of the sealing portion thereof for establishing passages which allow the interior of the annular chamber to be communicated to the atmosphere only upon generation of vacuum within the annular chamber, the auxiliary lip being deformed elastically by the vacuum, to thereby compensate or remove the vacuum generated within the annular chamber, while normally preventing fluid or air from flowing into the chamber from the atmosphere.

DETAILED DESCRIPTION OF THE PREFERRED EMBODIMENTS

Now, the invention will be described in conjunction with exemplary embodiments by referring to FIGS. 3 to 7.

Figure 1:
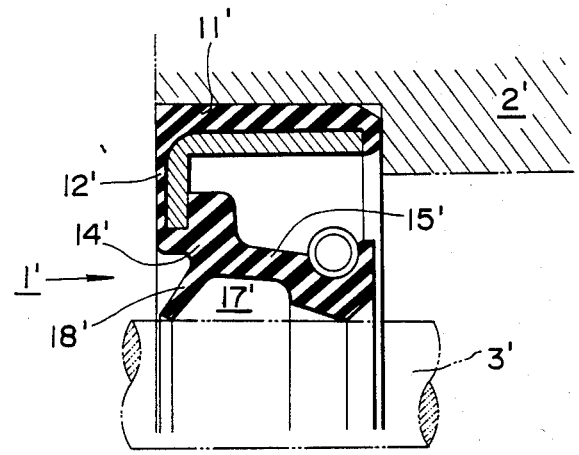
FIG. 1 shows in a fragmentary sectional view an oil seal of a hitherto known sealing apparatus.
Figure 2:
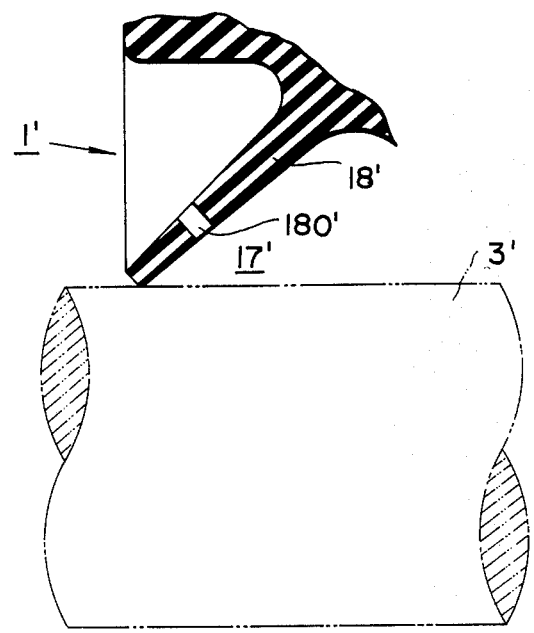
FIG. 2 shows in a fragmentary sectional view an auxiliary sealing lip of an oil seal of another known sealing apparatus.
Figure 3:
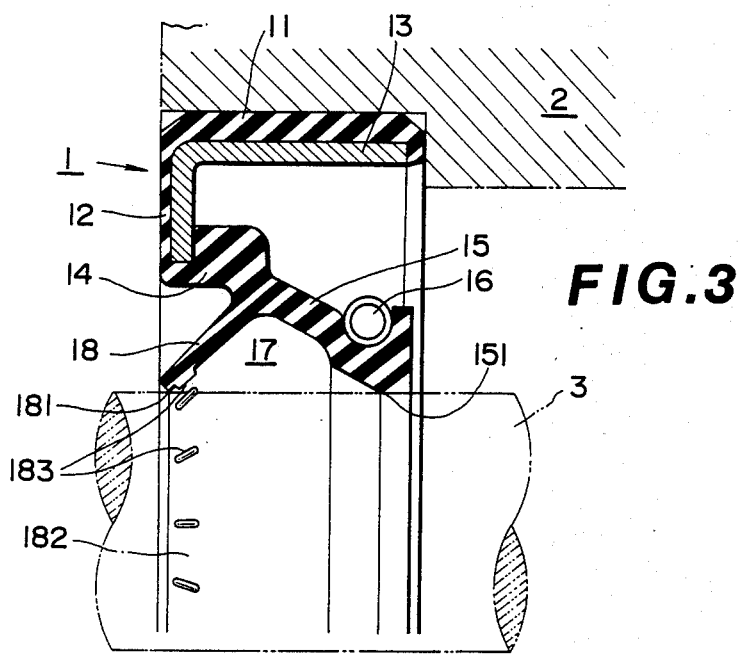
FIG. 3 shows in a fragmentary sectional view a sealing apparatus according to an embodiment of the present invention.
Figure 4:
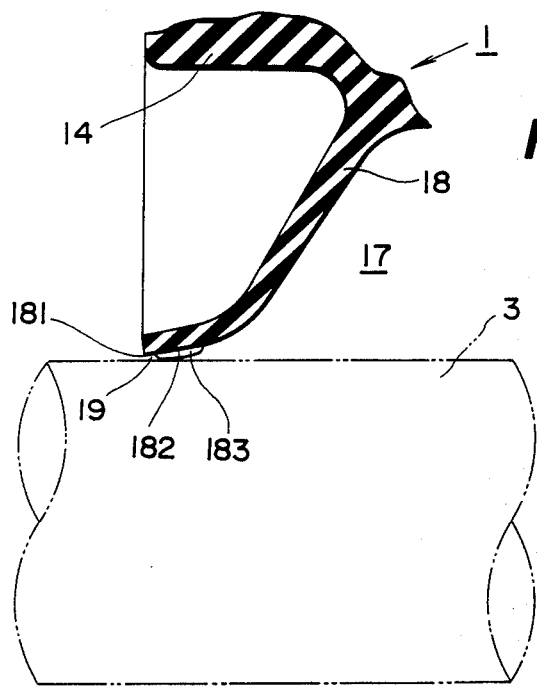
FIG. 4 shows in a partially enlarged view a main portion of the sealing apparatus shown in FIG. 3 in a state in which projections provided on the auxiliary lip are brought into contact with the peripheral surface of a rotating shaft to thereby form flow passages.
Figure 5:
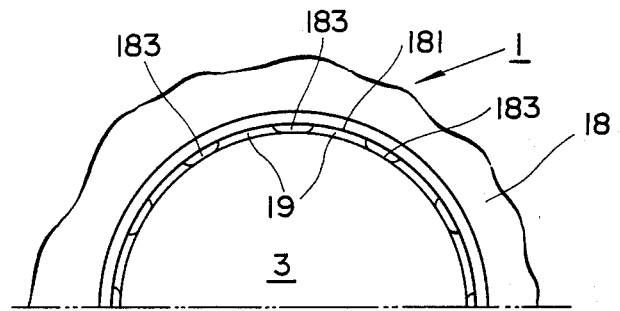
FIG. 5 is a front view of a main portion of the sealing apparatus shown in FIG. 3 for illustrating the state in which the passages are formed between the rotating shaft and the auxiliary lip.

Referring to FIGS. 3 to 5 which show a rotary oil seal constituting a sealing apparatus according to the present invention, a reference numeral 1 denotes generally a seal body of outer rubber periphery type formed of an elastic material and provided with a plurality of sealing lips. More particularly, the seal body 1 is composed of an outer peripheral portion 11 at which the seal body 1 is secured to a housing 2, a supporting portion 12 extending radially inwardly from the outer peripheral portion 11 at an end thereof and having an inner surface provided integrally with a reinforcing annular disc or annulus 13 made of a metal, and a base portion 14 formed integrally with the supporting portion 12 at the lower end thereof and extending substantially in the axial direction. An annular main lip 15 extending from the base portion 14 to the rotatable shaft 3 with an inclination thereto has a sealing portion which is formed along the inner circular edge of the annular main lip 151 and adapted to hermetically contact with the rotatable shaft 3. To this end, the sealing portion 151 is urged radially inwardly by means of an annular spring 16 disposed around the outer periphery of the sealing portion 151. On the other hand, an annular auxiliary lip 18 extending from the base portion 14 and forming an annular interposed space 17 in cooperation with the main lip 15 is provided with a sealing portion 181 along the circular inner edge portion thereof which is brought into hermetical contact with the rotatable shaft 3. It should be noted that the auxiliary lip 18 has an inner peripheral surface 182 facing the annular space 17 which surface is integrally provided with a plurality of projections or protrusions 183 in the vicinity of the sealing portion 181 with a predetermined distance between the adjacent projections 183. These projections or protrusions 183 are inclined relative to the rotatable shaft 3 so as to permit air to effectively flow into the annular space or chamber 17 from the atmosphere, when the shaft 3 is rotated and a vacuum is produced, as will be described below.

For mounting the seal body 1 of the structure described above, the peripheral portion 11 is snugly fitted within a recess 21 formed in the housing 2, which is followed by insertion of the rotatable shaft 3 through inner bores formed in the main lip 15 and the auxiliary lip 18. Then, the sealing portions 151 and 181 of the main lip 15 and the auxiliary lip 18, respectively, are brought into sealing contact with the rotatable shaft, whereby the confined annular chamber 17 is realized. When the shaft 3 is rotated in this state, fluid within the confined annular chamber 17 leaks progressively out of the chamber 17 (in the axially inward direction) through the sealing portion 151, as the result of which a vacuum (negative pressure) is produced in the confined annular chamber 17. Under the vacuum thus produced, the auxiliary lip 18 which is of smaller thickness than the main lip 15 is caused to be elastically bent in an arcuate form toward the interior of the annular chamber, resulting in that the tip end portion of the inner peripheral surface 182 of the auxiliary lip 18 facing the annular chamber 17 is brought into areal contact with the rotating shaft 3. However, by virtue of such arrangement that a plurality of projections 183 are formed in the inner peripheral surface 182 of the auxiliary lip 18 bent along the shaft 3, the sealing portion 181 is released from the close contact with the rotating shaft 3. In this manner, there are formed passages 19 along the peripheral surface of the rotating shaft 3, the inner peripheral surface 182 of the auxiliary lip 18 and side faces of the projections 183, as is illustrated in FIGS. 4 and 5. By way of the passages 19 thus formed, the annular chamber 17 is communicated with the atmosphere, whereby the vacuum prevailing within the chamber 17 is removed. Then, the auxiliary lip 18 can almost instantaneously restore the original position or state due to the inherent elasticity. The areal contact pressure at the sealing portion 181 of the auxiliary lip 18 can thus be constantly maintained at a normal level to prevent the sliding resistance or friction to the rotating shaft 3 from being increased. In this way, abrasion of both sealing portions 151 and 181 is positively excluded, with the improved sealing function or performance of the sealing apparatus being assured.

Figure 6:
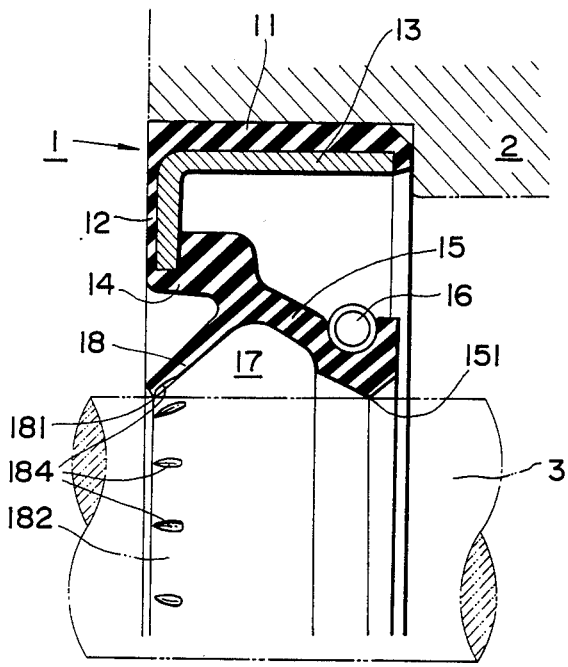
FIG. 6 shows in a fragmentary sectional view a sealing apparatus according to another embodiment of the invention.

FIG. 6 shows a sealing apparatus according to another embodiment of the invention which differs from the first embodiment described above in that a plurality of grooves 184 are formed in the inner peripheral surface 182 of the auxiliary lip 18 in the vicinity of the sealing portion 181 with inclination relative to the axial direction of the shaft 3. In the case of the sealing apparatus according to the second embodiment, a vacuum produced within the confined annular chamber 17 causes the auxiliary lip 18 to be progressively bent toward the chamber 17, as the result of which the auxiliary lip 18 is ultimately bent in an arcuate form with the inner peripheral surface 182 thereof being brought into contact with the surface of the rotating shaft 3, whereby the sealing portion 181 lands off from the surface of the rotating shaft 3. In this state, the plurality of grooves 184 formed in the inner peripheral surface 182 of the auxiliary lip 18 provide the passages 19 through which the annular chamber 17 is communicated to the atmosphere. Since the inclination of the grooves 184 relative to the rotating shaft 3 facilitates the suction of fluid or air from the atmosphere, the vacuum produced within the annular chamber can be effectively compensated.

Figure 7:
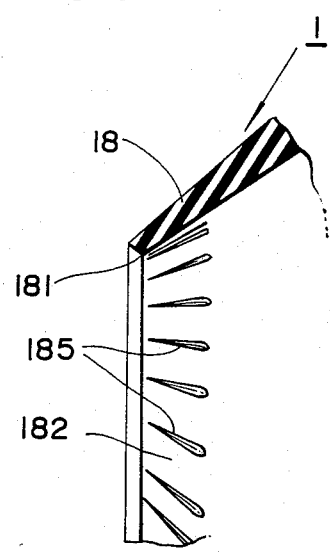
FIG. 7 is a partially enlarged view showing an auxiliary lip of a sealing apparatus according to a further embodiment of the invention.

FIG. 7 shows a sealing apparatus according to a further embodiment of the invention which differs from the one shown in FIG. 6 in that an increased number of grooves 185 are formed in the inner peripheral surface 182 of the auxiliary lip 18 facing the annular chamber 17 at locations in the vicinity of the sealing portion 181, and that the sectional area of each groove 185 is decreased so as to prevent dust or foreign particles from entering the annular chamber 17 when fluid or air flows into the latter through the passages provided by these grooves 185. It should be noted that the grooves 185 are also inclined relative to the axis of the shaft 3 so as to facilitate flowing of fluid into the annular chamber 17 from the atmosphere, as is in the case of the sealing apparatus shown in FIG. 6.

The sealing apparatus shown in FIGS. 6 and 7 can be advantageously used as the dustproof seal in the dusty environment, since entry of dust into the confined annular chamber 17 can be effectively prevented, whereby the sealing function of the sealing portions can be maintained in a satisfactory manner while suppressing positively the abrasion or other undesirable phenomena.

The sealing apparatus implemented in the structures described above bring about peculiar advantages mentioned below.

As described hereinbefore, the confined annular chamber is formed between the main lip and the auxiliary lip in cooperation with the peripheral surface of the rotatable shaft when the former is placed in contact with the latter. When the shaft is rotated, fluid within the confined annular chamber leaks therefrom in the axially inward direction between the main lip and the shaft surface because the main lip which hermetically closes the annular chamber from the space located internally of the main lip is subjected to a sucking force in the axially inward direction. As the result, a vacuum is produced within the annular chamber, whereby the auxiliary lip undergoes elastic deformation to be bent in an arcuate form toward the interior of the annular chamber, to thereby force the inner peripheral surface of the auxiliary lip facing the annular chamber to be brought into area contact with the rotating shaft. At that time, however, the flow passage forming means (i.e. the projections or grooves) formed in the inner peripheral surface provide passages through which the annular chamber can be communicated to the atmosphere, whereby the vacuum produced in the annular chamber is compensated.

As will be appreciated from the foregoing, with the arrangements of the sealing apparatus according to the present invention, it is possible to maintain constantly the contact pressure of the sealing portions of the main lip and the auxiliary lip at respective predetermined normal values by removing vacuum produced within the annular chamber before the contact pressure of the sealing portions has been excessively increased under the action of vacuum. Thus, the sealing apparatus according to the invention gives rise to no problems such as heat generation, abnormal abrasion or the like ascribable to the increased friction, as is the case of the hitherto known sealing apparatus, and can enjoy an improved sealing performance for an elongated period.

Further, in the sealing apparatus according to the invention, the auxiliary lip can restore the original position as soon as the vacuum within the annular chamber is cleared. Accordingly, communication between the atmosphere and the annular chamber is terminated in an extremely short time, which means that invasion of dusts or foreign particles into the annular chamber from the atmosphere can be suppressed to a minimum. In this way, premature abrasion of the sealing portions due to deposition or adhesion of dusts can be effectively excluded.

Although the invention has been described in conjunction with exemplary embodiments, it should be appreciated that many modifications and variations will readily occur to those skilled in the art without departing from the spirit and scope of the invention.

I claim:

1. An oil seal in which an elastic annular sealing body having a main annular lip and an auxiliary annular lip is combined co-axially with a rotatable shaft, said main annular lip and auxiliary annular lip extending to said rotatable shaft with inclination so as to define an annular chamber between said main annular lip and said auxiliary annular lip, said auxiliary annular lip having an annular sealing edge normally in sealing contact with said rotatable shaft, comprising:

flow passage forming means, including a plurality of spaced elements provided on the inner peripheral surface of said auxiliary annular lip facing said annular chamber at locations proximal to said sealing edge of said auxiliary annular lip, for elastically deforming said auxiliary annular lip, when a vacuum is generated in said annular chamber, such that said plurality of spaced elements engage said rotatable shaft causing said annular chamber to communicate with the atmosphere thereby cancelling or compensating for said vacuum while permitting said sealing edge of said auxiliary annular lip to make sealing contact with the surface of said rotatable shaft under normal conditions in which there is no vacuum in said annular chamber.

2. The oil seal of claim 1, wherein said elements comprise grooves.

3. The oil seal of claim 1, wherein said elements comprise projections.

4. An oil seal according to claim 3, wherein said projections are formed in said inner peripheral surface of said auxiliary annular lip with a predetermined distance between the adjacent projections.

5. An oil seal according to claim 4, wherein each of said projections is disposed inclined relative to the axis of said rotatable shaft.

6. An oil seal according to claim 2, wherein said grooves are formed in said inner peripheral surface of said auxiliary annular lip with a predetermined distance between the adjacent grooves.

7. An oil seal according to claim 6, wherein each of said grooves has a reduced cross-sectional area.

8. An oil seal according to claim 6 or 7, wherein each of said grooves is disposed inclined relative to the axis of said rotatable shaft.

* * * * *